US012611986B2

(12) United States Patent
Kim

(10) Patent No.: US 12,611,986 B2
(45) Date of Patent: Apr. 28, 2026

(54) VEHICLE AND CONTROL METHOD OF VEHICLE

(71) Applicants: Hyundai Motor Company, Seoul (KR); Kia Corporation, Seoul (KR)

(72) Inventor: Youngkee Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 123 days.

(21) Appl. No.: 18/425,716

(22) Filed: Jan. 29, 2024

(65) Prior Publication Data

US 2024/0399955 A1      Dec. 5, 2024

(30) Foreign Application Priority Data

Jun. 2, 2023      (KR) ........................ 10-2023-0071735

(51) Int. Cl.
| | |
|---|---|
| *B60Q 9/00* | (2006.01) |
| *B60Q 5/00* | (2006.01) |
| *B60R 1/26* | (2022.01) |
| *B60T 7/22* | (2006.01) |
| *B60T 8/171* | (2006.01) |
| *B60T 8/58* | (2006.01) |

(Continued)

(52) U.S. Cl.
CPC ............. B60Q 9/008 (2013.01); B60Q 5/006 (2013.01); B60R 1/26 (2022.01); B60T 7/22 (2013.01); B60T 8/171 (2013.01); B60T 8/58 (2013.01); B60T 8/86 (2013.01); G06T 7/70 (2017.01); B60R 2300/8046 (2013.01); B60T 2201/024 (2013.01); B60T 2210/32 (2013.01);

*B60T 2220/02* (2013.01); *B60T 2250/04* (2013.01); *G06T 2207/30201* (2013.01); *G06T 2207/30268* (2013.01)

(58) Field of Classification Search
CPC .......... B60Q 9/008; B60Q 5/006; G06T 7/70; G06T 2207/30201; G06T 2207/30268; B60R 1/26; B60R 2300/8046; B60T 7/22; B60T 8/171; B60T 8/58; B60T 8/86; B60T 2201/024; B60T 2210/32; B60T 2220/02; B60T 2250/04
USPC .......................................................... 701/93
See application file for complete search history.

(56) References Cited

U.S. PATENT DOCUMENTS

| | | | | |
|---|---|---|---|---|
| 2008/0245597 | A1* | 10/2008 | Paulson | .................... B60T 7/22 |
| | | | | 180/275 |
| 2021/0070359 | A1* | 3/2021 | Lee | ......................... G06V 20/58 |
| 2021/0323515 | A1* | 10/2021 | Scheuerell | ............. B60K 35/50 |

FOREIGN PATENT DOCUMENTS

| | | | | |
|---|---|---|---|---|
| DE | 102013007257 | A1 * | 10/2014 | ............ B60W 10/04 |
| JP | 2008004040 | A | 1/2008 | |
| JP | 2015211741 | A * | 11/2015 | |

* cited by examiner

*Primary Examiner* — Hitesh Patel
*Assistant Examiner* — Austin Robert Chennault
(74) *Attorney, Agent, or Firm* — SLATER MATSIL, LLP

(57) ABSTRACT

An embodiment vehicle includes a transmission configured to set a travel direction of the vehicle, an indoor camera configured to capture a driver of the vehicle, a cluster configured to display information while the vehicle is in operation, and a main controller configured to, in response to the transmission being shifted to reverse, identify whether a gaze of the driver captured by the indoor camera is directed (Continued)

to a rear of the vehicle and, in response to a determination
that the gaze of the driver is not directed to the rear, control
to display a warning message.

12 Claims, 5 Drawing Sheets

(51) Int. Cl.
  *B60T 8/86*          (2006.01)
  *G06T 7/70*          (2017.01)

1111 — IDENTIFY THAT TRANSMISSION IS SHIFTED TO REVERSE

1113 — DOES DRIVER NOT LOOK AT REAR OF VEHICLE?

No

Yes

GENERATE WARNING MESSAGE AND WARNING SOUND — 1115

LIMIT REVERSE SPEED OF VEHICLE — 1117

1119 — IS OBSTACLE DETECTED?

No

Yes

1121 — PERFORM EARLY BRAKING AND GENERATE WARNING

1215 — DETECT OBSTACLE

1217 — PERFORM REAR COLLISION PREVENTION OPERATION

VEHICLE AND CONTROL METHOD OF VEHICLE

CROSS-REFERENCE TO RELATED APPLICATIONS

This application claims the benefit of Korean Patent Application No. 10-2023-0071735, filed on Jun. 2, 2023, which application is hereby incorporated herein by reference.

TECHNICAL FIELD

The disclosure relates to a vehicle and a control method thereof.

BACKGROUND

An advanced driver assistance system (ADAS) is a system for assisting a driver's safe and convenient driving. ADAS includes a variety of technologies designed to improve driving safety, driver comfort, and efficiency.

In general, ADAS uses sensors such as radar, laser imaging, detection, and ranging (LIDAR), and cameras to detect the vehicle's surroundings, and processes the data from the sensors to send a warning to a driver or automatically adjust the vehicle. ADAS includes lane departure warning systems (LDWS), automatic emergency braking (AEB), adaptive cruise control (ACC), rear cross traffic alert (RCTA), lane keeping assist systems (LKAS), and the like.

ADAS assists a driver while driving and may prevent collisions with obstacles by detecting nearby obstacles when the vehicle is reversing. However, in a case where a driver does not look behind the vehicle when reversing, existing ADAS does not provide a warning, resulting in accidents.

SUMMARY

The disclosure relates to a vehicle and a control method thereof. Particular embodiments relate to a vehicle capable of preventing a collision with an obstacle when reversing and a control method thereof.

An embodiment of the disclosure provides a vehicle that may identify whether a driver looks behind when reversing to assist in safe driving and a control method thereof.

Additional embodiments of the disclosure will be set forth in part in the description which follows and, in part, will be obvious from the description, or may be learned by practice of embodiments of the disclosure.

According to an embodiment of the disclosure, a vehicle may include a transmission configured to set a travel direction of the vehicle, an indoor camera configured to capture a driver of the vehicle, a cluster configured to display information while the vehicle is in operation, and a main controller configured to identify whether a driver's gaze captured by the indoor camera is directed to a rear of the vehicle in response to the transmission being shifted to reverse, and based on identifying that the driver's gaze is not directed to the rear, control the cluster to display a warning message.

The main controller may be configured to identify whether the driver's gaze is directed to one of a rearview mirror, a side mirror, or a rear windshield installed on the vehicle.

The vehicle may further include a rear camera configured to capture the rear of the vehicle and an input/output device configured to display an image captured by the rear camera, wherein the main controller may be configured to control at least one of the cluster or the input/output device to display the warning message based on identifying that the driver's gaze is not directed to the rear.

The main controller may be configured to identify whether the driver's gaze is directed to one of a rearview mirror, a side mirror, a rear windshield, or the input/output device installed on the vehicle.

The vehicle may further include a brake controller configured to control a braking system of the vehicle, wherein the main controller may be configured to control the brake controller based on identifying that the driver's gaze is not directed to the rear.

The main controller may be configured to control the brake controller to allow a speed of the vehicle to be less than or equal to a predetermined speed based on identifying that the driver's gaze is not directed to the rear.

The vehicle may further include a detection sensor installed on the vehicle and configured to detect an obstacle in at least one of the rear or sides of the vehicle, wherein the main controller may be configured to control the brake controller to stop the vehicle in response to an obstacle being detected by the detection sensor in the travel direction of the vehicle.

The main controller may be configured to control the brake controller to brake the vehicle earlier than a preset time based on an estimated time remaining until collision with the obstacle in response to the driver's gaze not being directed to the rear and the obstacle being detected in the travel direction of the vehicle.

The vehicle may further include a speaker installed on the vehicle and configured to output a sound, wherein the main controller may be configured to control the speaker to output a warning sound based on identifying that the driver's gaze is not directed to the rear.

According to an embodiment of the disclosure, a control method of a vehicle may include identifying, by a main controller, whether a transmission configured to set a travel direction of the vehicle is shifted to reverse, identifying, by the main controller, whether a driver of the vehicle does not look at a rear of the vehicle by controlling an indoor camera configured to capture the driver of the vehicle, and based on identifying that the driver does not look at the rear, controlling, by the main controller, a cluster to display a warning message, the cluster being configured to display information while the vehicle is in operation.

The identifying of whether the driver of the vehicle does not look at the rear may identify, by the main controller, whether a gaze of the driver is directed to one of a rearview mirror, a side mirror, or a rear windshield installed on the vehicle.

The control method may further include controlling, by the main controller, at least one of the cluster or an input/output device to display the warning message based on identifying that the driver does not look at the rear, wherein the input/output device may be configured to display an image captured by a rear camera configured to capture the rear of the vehicle.

The identifying of whether the driver of the vehicle does not look at the rear may identify, by the main controller, whether a gaze of the driver is directed to one of a rearview mirror, a side mirror, a rear windshield, or the input/output device installed on the vehicle.

The control method may further include controlling, by the main controller, a brake controller configured to control a braking system of the vehicle based on identifying that a gaze of the driver is not directed to the rear.

The controlling of the brake controller by the main controller may control a speed of the vehicle to be less than or equal to a predetermined speed.

The control method may further include, in response to an obstacle being detected by a detection sensor in the travel direction of the vehicle, controlling, by the main controller, the brake controller to stop the vehicle, wherein the detection sensor is installed on the vehicle and is configured to detect the obstacle in at least one of the rear or sides of the vehicle.

The controlling of the brake controller by the main controller may control the brake controller to brake the vehicle earlier than a preset time based on an estimated time remaining until collision with the obstacle in response to the driver's gaze not being directed to the rear and the obstacle being detected in the travel direction of the vehicle.

The control method may further include, based on identifying that a gaze of the driver is not directed to the rear, controlling, by the main controller, a speaker to output a warning sound, wherein the speaker is installed on the vehicle and is configured to output a sound.

BRIEF DESCRIPTION OF THE DRAWINGS

These and/or other embodiments of the disclosure will become apparent and more readily appreciated from the following description of the embodiments taken in conjunction with the accompanying drawings of which.

DETAILED DESCRIPTION OF ILLUSTRATIVE EMBODIMENTS

Hereinafter, embodiments of the disclosure will be described in detail with reference to the accompanying drawings.

In describing embodiments of the present disclosure, where it is deemed that a detailed description of a related known configuration or function may obscure the gist of an embodiment of the disclosure, the detailed description is omitted.

Also, it is to be understood that when a component is referred to as being "connected to," "supported by," "communicated with," "delivered to," or "in contact with" another component, it means that the component may be connected, supported, communicated, delivered, or in contact with the other component directly or via a third component.

The terms used in the present specification are merely used to describe the embodiments and are not intended to limit and/or restrict the embodiments of the disclosure. It is to be understood that the singular forms are intended to include the plural forms as well, unless the context clearly dictates otherwise The terms "front," "rear," "left," "right," and the like, as used herein, are defined with reference to the drawings, but the terms do not limit the shape and position of the respective components. In the accompanying drawings, some components are exaggerated, omitted, or schematically shown, and the size of each component does not entirely reflect the actual size.

It is to be understood that although the terms including ordinal numbers such as "first," "second," etc. may be used herein to describe various components, such components are not to be limited by such terms.

It is to be understood that the term "includes" when used in this specification specifies the presence of stated features, integers, steps, operations, elements, and/or components, but does not preclude the presence or addition of at least one other feature, integer, step, operation, element, component, and/or group thereof.

Figure 1:
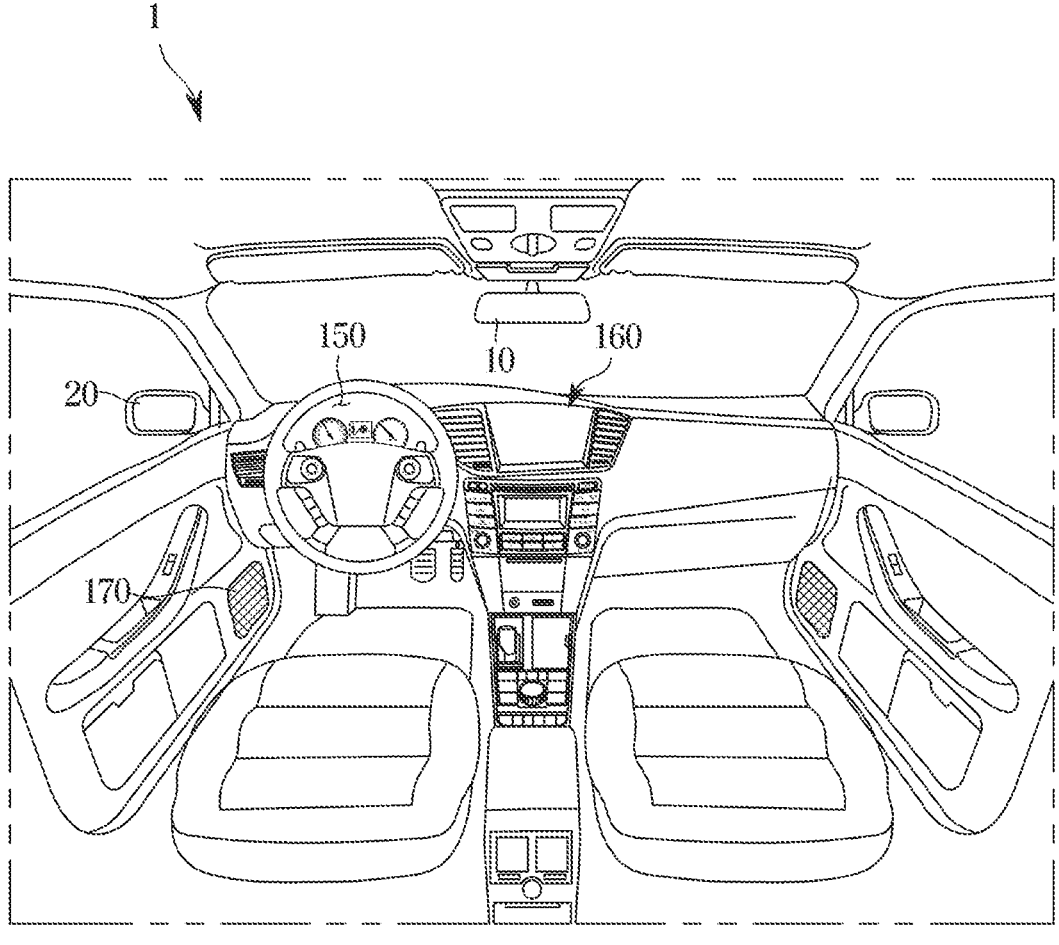
FIG. 1 illustrates an interior of a vehicle according to an embodiment.

A vehicle 1 according to embodiments of the disclosure is described with reference to FIG. 1. According to an embodiment of the disclosure, the vehicle 1 includes a rearview mirror 10, a side mirror 20, a cluster 150, and an input/output device 160.

The rearview mirror 10 is disposed inside the vehicle 1 and may allow a driver of the vehicle 1 to check a rear seat and a rear of the vehicle 1 through a rear windshield of the vehicle 1.

The side mirror 20 is disposed outside of the vehicle 1 on left and right sides of the vehicle 1, respectively, allowing the driver to check the rear lateral sides of the vehicle 1.

The cluster 150 is positioned on a dashboard so that the driver may view the cluster from a driver's seat, and information for confirming a state of the vehicle 1, such as a speed and engine revolutions per minute (RPM) of the vehicle 1 may be displayed on the cluster.

The input/output device 160 is positioned on the dashboard of the vehicle 1 to display various information or to allow a user to input information. Also, when a transmission 110 (e.g., a gear shift input device) of the vehicle 1 is shifted to reverse, the input/output device 160 may display an image captured by a rear camera 130.

Figure 2:
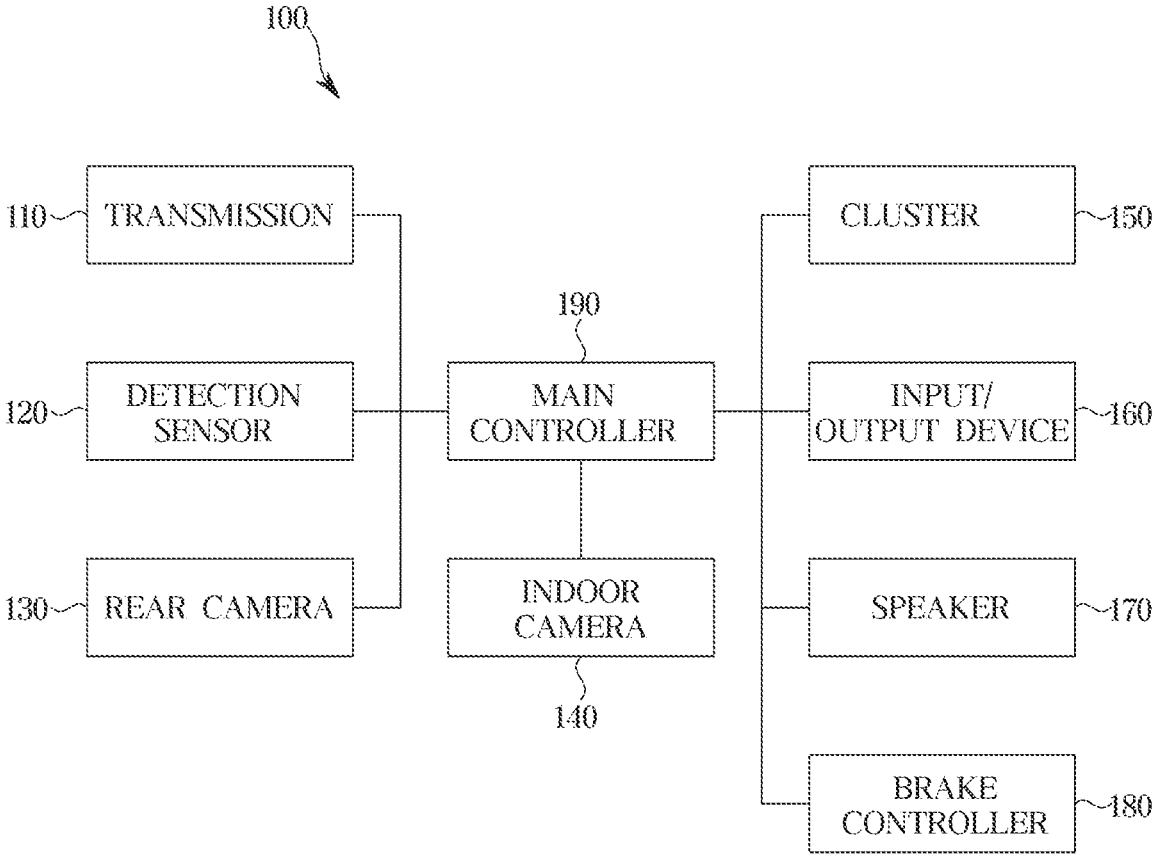
FIG. 2 is a block diagram illustrating a safety driving apparatus of a vehicle according to an embodiment.

A safety driving apparatus 100 of the vehicle 1 according to an embodiment of the disclosure is described with reference to FIG. 2. The safety driving apparatus 100 of the vehicle 1 according to an embodiment of the disclosure includes the transmission 110, a detection sensor 120, the rear camera 130, an indoor camera 140, the cluster 150, the input/output device 160, a speaker 170, a brake controller 180, and a main controller 190.

The transmission 110 controls a driving direction of the vehicle 1 so that the vehicle 1 moves forward or backward when traveling and is disposed inside the vehicle 1 to allow the driver to operate the transmission 110. The transmission 110 may be disposed in the center of the interior of the vehicle 1, but it is not limited thereto. The transmission 110 may also be positioned behind a steering wheel, or it may be placed on the steering wheel in the form of paddle shifters.

The detection sensor 120 is disposed outside the vehicle 1 and may detect an obstacle 2 in front of or behind the vehicle 1. The detection sensor 120 may detect the obstacle 2 using ultrasonic waves, radar, and various other methods.

The rear camera 130 is disposed at a rear side of the vehicle 1 to capture an image of the rear of the vehicle 1. The rear camera 130 may operate to capture images of the rear of the vehicle 1 at all times, but it may also operate in response to the transmission 110 being shifted to reverse.

The indoor camera 140 is disposed inside the vehicle 1 and captures the driver. To this end, the indoor camera 140 may be disposed in a position adjacent to the rearview mirror 10 inside the vehicle 1 or in a position adjacent to the driver. The indoor camera 140 may specifically capture a direction in which the driver's gaze is directed. In the embodiment, the indoor camera 140 may operate at any time while the vehicle 1 is operating, but it may also operate in response to the transmission 110 being shifted to reverse.

The brake controller 180 controls and monitors a braking system of the vehicle 1. To this end, the brake controller 180 may check a braking force, speed, and acceleration of the vehicle 1, a distance between vehicles, an obstacle, and the like, and may control braking to enable the vehicle 1 to be driven at a safe speed and to prevent collisions. The brake controller 180 may control the braking of the vehicle 1 using information collected through the detection sensor 120 and the rear camera 130 while the vehicle 1 is traveling.

The main controller 190 may collect various information about the vehicle 1 and control various devices of the vehicle 1 based on the collected information. In the embodiment, the main controller 190 collects information about a gear shifted in the transmission 110 and information detected by the detection sensor 120. In addition, the main controller 190 collects image information through the rear camera 130 and the indoor camera 140. The main controller 190 may also control each of the cluster 150 and the input/output device 160 so that various information may be displayed on at least one of the cluster 150 or the input/output device 160. The brake controller 180 may also control the brake controller 180 to perform braking.

In the embodiment, the main controller 190 uses information about image captured by the indoor camera 140 to identify whether the driver looks behind when the transmission 110 of the vehicle 1 is shifted to reverse. To this end, the main controller 190 may identify whether the driver looks at one of the rearview mirror 10, the side mirror 20, or the input/output device 160, or whether the driver turns his or her head to look behind the vehicle, based on the image captured by the indoor camera 140.

For example, the main controller 190 may analyze a driver's facial movement using the indoor camera 140 to analyze a driver's gaze. The main controller 190 may analyze a driver's face image captured by the indoor camera 140 and may identify whether the driver's gaze is directed to the rearview mirror 10, one of the two side mirrors 20, or the input/output device 160 based on the direction in which the driver's face is facing.

When it is identified that the driver does not look at the rear of the vehicle 1 in a state where the transmission 110 is shifted to reverse, the main controller 190 may control at least one of the cluster 150 or the input/output device 160 to display a guide message and a warning message. In addition, the main controller 190 may control the speaker 170 to output a warning sound.

Further, in a state where the transmission 110 is shifted to reverse and it is identified that the driver does not look at the rear of the vehicle 1, when the obstacle 2 is detected by at least one of the detection sensor 120 or the rear camera 130, the main controller 190 may control the brake controller 180 so that the braking system of the vehicle 1 is operated to control the speed of the vehicle 1.

Figure 3:
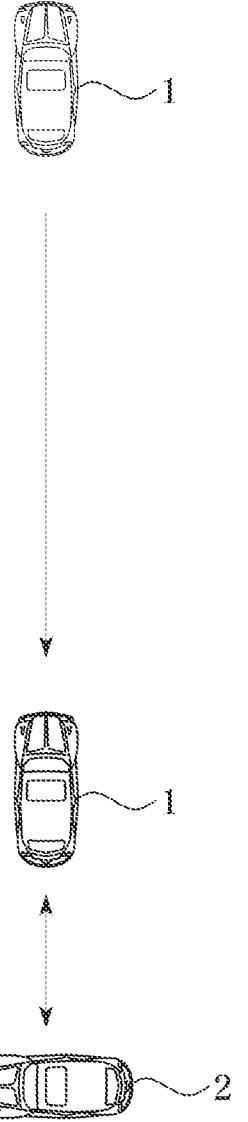
FIG. 3 is a diagram illustrating autonomous braking of an existing vehicle.

As shown in FIG. 3, in a case where an existing vehicle 1 equipped with ADAS detects the obstacle 2 while reversing, the main controller 190 controls the brake controller 180 to prevent the vehicle 1 from colliding with the obstacle 2. In this instance, the main controller 190 is incapable of controlling the cluster 150 or the input/output device 160 to separately generate a warning.

Figure 4:
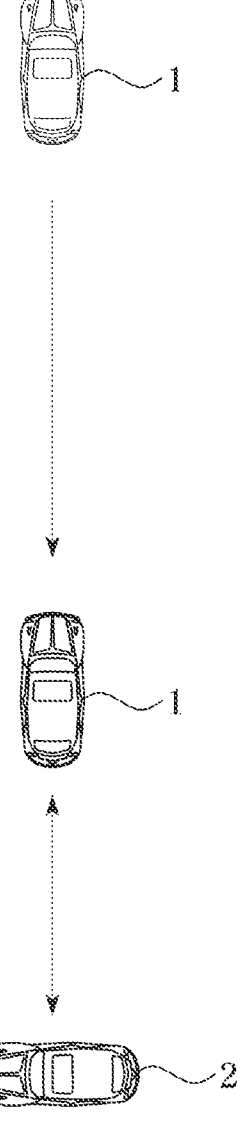
FIG. 4 is a diagram illustrating that braking is performed by a safety driving apparatus of a vehicle according to an embodiment.

However, in the embodiment, as shown in FIG. 4, when it is identified that the driver does not look at the rear while reversing, the main controller 190 may control the brake controller 180 for early braking. In addition, the main controller 190 may control a speed of the vehicle 1 to be less than or equal to a predetermined speed (e.g., 10 km/h). The main controller 190 may control at least one of the cluster 150 or the input/output device 160 to display a warning message to remind the driver to look behind. The main controller 190 may also control the speaker 170 to output a warning message.

Here, the main controller 190 may set an estimated time remaining until collision with the obstacle 2 to be longer than a preset time in order to allow for early braking. For example, in a case where an estimated time remaining until collision with the obstacle 2 is 1 second in an existing vehicle, the main controller 190 according to an embodiment of the disclosure may control the brake controller 180 to set an estimated time remaining until collision with the obstacle 2 to be 1.5 seconds. Accordingly, even when the driver reverses the vehicle 1 without looking behind, a likelihood of the vehicle 1 colliding with the obstacle 2 may be minimized.

Figure 5:
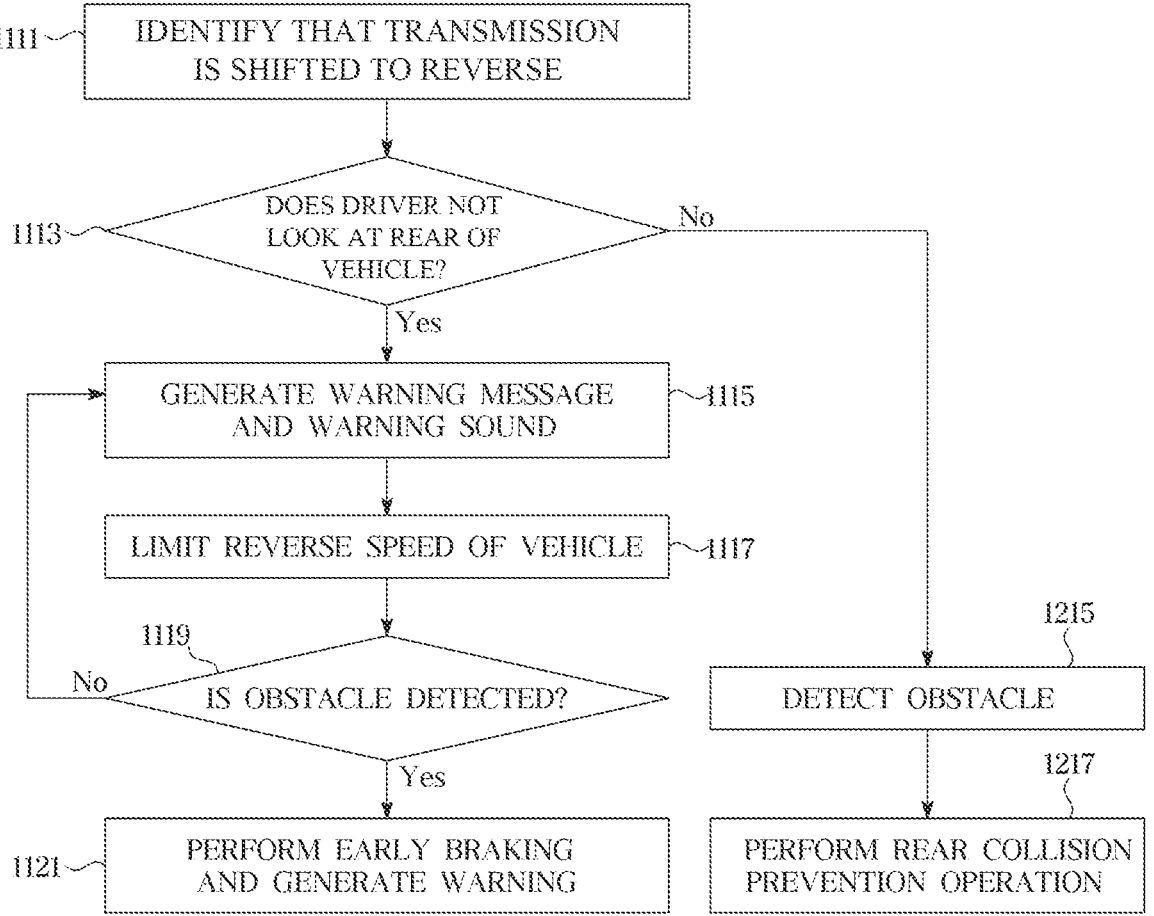
FIG. 5 is a flowchart illustrating a method of controlling a vehicle by a safety driving apparatus according to an embodiment.

A method of controlling the vehicle 1 using the safety driving apparatus 100 of the vehicle 1 according to an embodiment of the disclosure is described with reference to FIG. 5. The control method of the vehicle 1 of an embodiment of the disclosure is described with reference to FIG. 1 to FIG. 4.

The main controller 190 may identify that the transmission 110 is shifted to reverse (1111).

When a driver shifts the transmission 110 to a reverse gear to reverse the vehicle 1, the main controller 190 may receive, from the transmission 110, information about the transmission 110 shifted to reverse by the driver.

The main controller 190 may identify whether the driver does not look at a rear of the vehicle 1 (1113).

The main controller 190 may identify whether the driver does not look at the rear based on an image captured by the indoor camera 140. The indoor camera 140 may capture a driver's facial movement, and the main controller 190 may analyze the driver's facial movement in the image captured by the indoor camera 140 to analyze a driver's gaze.

Accordingly, the main controller 190 may identify whether the driver's gaze is directed to one of the rearview mirror 10, the side mirror 20, or the input/output device 160.

In response to a determination that the driver does not look at the rear (Yes at 1113), a warning message and warning sound may be generated in the vehicle 1 (1115).

The main controller 190 may control at least one of the cluster 150, the input/output device 160, or the speaker 170 so that a warning is output on at least one of the cluster 150 or the input/output device 160 and a warning sound is generated from the speaker 170. When it is identified that the driver's gaze is not directed to the rear in a state where the transmission 110 of the vehicle 1 is shifted to reverse, the main controller 190 may control at least one of the cluster 150 or the input/output device 160 to display a warning message. In addition, the main controller 190 may control the speaker 170 to generate the warning sound.

Accordingly, the driver may look at the rear of the vehicle 1 due to the warning message from the cluster 150 or the input/output device 160 or the warning sound from the speaker 170. Here, the warning message generated in at least one of the cluster 150 or the input/output device 160 may be displayed in the form of a pop-up message or a flashing message.

In addition, the main controller 190 may continuously check whether the driver does not look at the rear as required, and when it is identified that the driver looks at the rear, the main controller 190 may control at least one of the cluster 150, the input/output device 160, or the speaker 170 to stop the generated warning message and warning sound.

The main controller 190 may control the brake controller 180 to limit a reverse speed of the vehicle 1 (1117).

The main controller 190 may control the brake controller 180 to prevent the vehicle 1 from accelerating beyond a predetermined speed while reversing. The main controller 190 may control the brake controller 180 to prevent the vehicle 1 from accelerating more than the predetermined speed (e.g., 10 km/h) even when the vehicle 1 accelerates in a state where the transmission 110 of the vehicle 1 is shifted to reverse. Accordingly, even when the driver continuously depresses an accelerator pedal, the speed of the vehicle 1 may not exceed the predetermined speed.

As such, the speed of the vehicle 1 does not exceed the predetermined speed, and thus a system that assists the driving of the vehicle 1, such as ADAS, may control the vehicle 1 more quickly.

The main controller 190 may identify whether an obstacle 2 exists in a travel direction of the vehicle 1 (1119).

The main controller 190 may identify whether the obstacle 2 exists in the travel direction of the vehicle 1 while reversing, through the detection sensor 120 and the rear camera 130. The detection sensor 120 may detect whether the obstacle 2 exists within a predetermined range behind and to the sides of the vehicle 1, and the rear camera 130 may operate to capture the rear of the vehicle 1 when the transmission 110 is shifted to reverse. Accordingly, the main controller 190 may analyze a signal generated from the detection sensor 120 and an image captured by the rear camera 130, thereby identifying whether the obstacle 2 exists in the travel direction of the vehicle while the vehicle 1 is reversing.

Here, when it is identified that the obstacle 2 exists in the travel direction of the vehicle 1, the main controller 190 may continuously control at least one of the cluster 150 or the input/output device 160 to generate a warning message, and may control the speaker 170 to generate a warning sound.

The vehicle 1 may be braked early and the warning about the obstacle 2 may be generated (1121).

When it is identified that the obstacle 2 exists in the travel direction of the vehicle 1, the main controller 190 may control the brake controller 180 to early brake the vehicle 1 to prevent collision with the obstacle 2. In order to warn the driver of collision with the obstacle 2, the main controller 190 may control at least one of the cluster 150, the input/output device 160, or the speaker 170 to generate the warning message or warning sound.

Here, the main controller 190 may move up a timing of controlling the vehicle 1 based on an estimated time remaining until collision with the obstacle 2 for early braking. For example, the main controller 190 of an existing vehicle controls the vehicle at a time that the estimated time remaining until collision with the obstacle 2 is 1 second, while the main controller 190 according to the embodiment of the disclosure may control the vehicle 1 at a time that the estimated time remaining until collision with the obstacle 2 is 1.5 seconds. Accordingly, even when the driver reverses the vehicle 1 without looking behind, a likelihood of the vehicle 1 colliding with the obstacle 2 may be minimized.

The warning generated in operation 1121 may be different from the warning generated in operation 1115 and may be a warning message or warning sound to warn of the risk of collision with the obstacle 2.

In response to a determination that the driver's gaze is directed to the rear (No at 1113), the main controller 190 detects the obstacle 2 (1215).

In a state where it is identified that the driver looks at the rear in operation 1113, the main controller 190 may detect the obstacle 2 in the travel direction of the vehicle 1 through at least one of the detection sensor 120 or the rear camera 130.

A rear collision prevention operation may be performed (1217).

The brake controller 180 may control a braking system of the vehicle 1 so that the vehicle 1 is braked according to the estimated time remaining until collision with the obstacle 2 (e.g., 1 second).

As is apparent from the above, according to the embodiments of the disclosure, the vehicle may generate a warning in a case where a driver does not look behind while the vehicle is reversing, thereby preventing safety accidents that may occur around the vehicle.

Furthermore, when a driver is driving without looking behind, early braking may be controlled to be performed to prevent safety accidents from occurring in advance.

Although embodiments have been described for illustrative purposes, those skilled in the art will appreciate that various modifications, additions, and substitutions are possible, without departing from the scope and spirit of the embodiments of the disclosure. Therefore, embodiments have not been described for limiting purposes.

What is claimed is:

1. A vehicle, comprising:
a transmission configured to set a travel direction of the vehicle;
an indoor camera configured to capture a driver of the vehicle;
a cluster configured to display information while the vehicle is in operation;
a main controller configured to:
in response to the transmission being shifted to reverse, identify whether a gaze of the driver captured by the indoor camera is directed to a rear of the vehicle; and
in response to a determination that the gaze of the driver is not directed to the rear, control to display a warning message;
a brake controller configured to control a braking system of the vehicle; and
a detection sensor installed on the vehicle and configured to determine an obstacle at a side of or to the rear of the vehicle, wherein;
in response to the determination that the gaze of the driver is not directed to the rear and the obstacle being determined by the detection sensor in the travel direction of the vehicle, the main controller is further configured to control the brake controller to brake the vehicle earlier than a preset time based on an estimated time remaining until collision with the obstacle, and
the main controller is further configured to control the brake controller to allow a speed of the vehicle to be less than or equal to a predetermined speed in response to the determination that the gaze of the driver is not directed to the rear.

2. The vehicle of claim 1, wherein the main controller is further configured to identify whether the gaze of the driver is directed to a rearview mirror, a side mirror, or a rear windshield installed on the vehicle.

3. The vehicle of claim 1, further comprising:

a rear camera configured to capture an image of the rear of the vehicle; and an input/output device configured to display the image captured by the rear camera.

4. The vehicle of claim 3, wherein the main controller is further configured to control the cluster or the input/output device to display the warning message.

5. The vehicle of claim 3, wherein the main controller is further configured to identify whether the gaze of the driver is directed to a rearview mirror, a side mirror, a rear windshield, or the input/output device installed on the vehicle.

6. The vehicle of claim 1, further comprising:

a speaker installed on the vehicle and configured to output a sound, wherein the main controller is further configured to control the speaker to output a warning sound in response to the determination that the gaze of the driver is not directed to the rear.

7. A method of controlling a vehicle using a main controller, the method comprising:

identifying that a transmission configured to set a travel direction of the vehicle is shifted to reverse;

determining whether a driver of the vehicle looks at a rear of the vehicle by controlling an indoor camera to capture the driver of the vehicle;

in response to a determination that the driver does not look at the rear, controlling to display a warning message to the driver;

in response to determining that the driver does not look at the rear, controlling a brake controller to control a braking system of the vehicle; and determining whether an obstacle is determined in the travel direction of the vehicle by a detection sensor installed on the vehicle to determine the obstacle on a side or to the rear of the vehicle, wherein;

in response to the determination that the driver does not look at the rear and in response to the determination that the obstacle is determined, controlling the brake controller comprises braking the vehicle earlier than a preset time based on an estimated time remaining until collision with the obstacle, and controlling the brake controller further comprises controlling the brake controller to allow a speed of the vehicle to be less than or equal to a predetermined speed in response to the determination that the driver does not look to the rear.

8. The method of claim 7, wherein determining whether the driver of the vehicle looks at the rear comprises determining whether a gaze of the driver is directed to a rearview mirror, a side mirror, or a rear windshield installed on the vehicle.

9. The method of claim 7, wherein controlling to display the warning message to the driver comprises controlling a cluster or an input/output device to display the warning message.

10. The method of claim 9, wherein the cluster displays information while the vehicle is in operation and the input/output device displays an image of the rear of the vehicle captured by a rear camera.

11. The method of claim 9, wherein determining whether the driver of the vehicle looks at the rear comprises determining whether a gaze of the driver is directed to a rearview mirror, a side mirror, a rear windshield, or the input/output device installed on the vehicle.

12. The method of claim 7, further comprising, in response to the determination that the driver does not look at the rear, controlling a speaker installed on the vehicle to output a warning sound.

* * * * *